(12) United States Patent
Subbarao et al.

(10) Patent No.: US 8,650,078 B2
(45) Date of Patent: Feb. 11, 2014

(54) METHODS AND SYSTEMS FOR PAYING WITH LOYALTY CURRENCY DURING IN-STORE SHOPPING

(75) Inventors: Murali B. Subbarao, Saratoga, CA (US); Shankar A. Chittoor, Fremont, CA (US); Allwyn Lobo, Campbell, CA (US)

(73) Assignee: Billeo, Inc., Santa Clara, CA (US)

( * ) Notice: Subject to any disclaimer, the term of this patent is extended or adjusted under 35 U.S.C. 154(b) by 0 days.

(21) Appl. No.: 13/345,643

(22) Filed: Jan. 6, 2012

(65) Prior Publication Data

US 2012/0226537 A1    Sep. 6, 2012

Related U.S. Application Data

(63) Continuation-in-part of application No. 13/041,343, filed on Mar. 4, 2011.

(51) Int. Cl.
*G06Q 30/00* (2012.01)

(52) U.S. Cl.
USPC ............... 705/14.33; 705/14.3; 705/14.27; 705/14.38

(58) Field of Classification Search
USPC ..................................... 705/14.33
See application file for complete search history.

(56) References Cited

U.S. PATENT DOCUMENTS

| | | | |
|---|---|---|---|
| 2004/0181453 A1* | 9/2004 | Ray et al. | 705/16 |
| 2005/0021399 A1* | 1/2005 | Postrel | 705/14 |
| 2009/0248506 A1* | 10/2009 | Goldstein et al. | 705/14 |

OTHER PUBLICATIONS

USBank, "MAT Code Directory", 2004.*

* cited by examiner

*Primary Examiner* — John G Weiss
*Assistant Examiner* — Scott C Anderson
(74) *Attorney, Agent, or Firm* — Benjamin A. Balser; Balser & Grell IP Law

(57) ABSTRACT

Methods and systems for paying with loyalty currency at a store merchant by a user using a mobile app are provided. The user is presented with the loyalty currency balance information and one or more store merchants located in proximity of the user. The user may select a store merchant from the one or more store merchants. Thereafter, user is presented with one or more transaction rules associated with the selected store and an activation button for activating pay with points. The user may opt for activating pay with points for upcoming purchase transaction at the selected store based on the one or more transaction rules, thereby redeeming the loyalty currency.

18 Claims, 8 Drawing Sheets

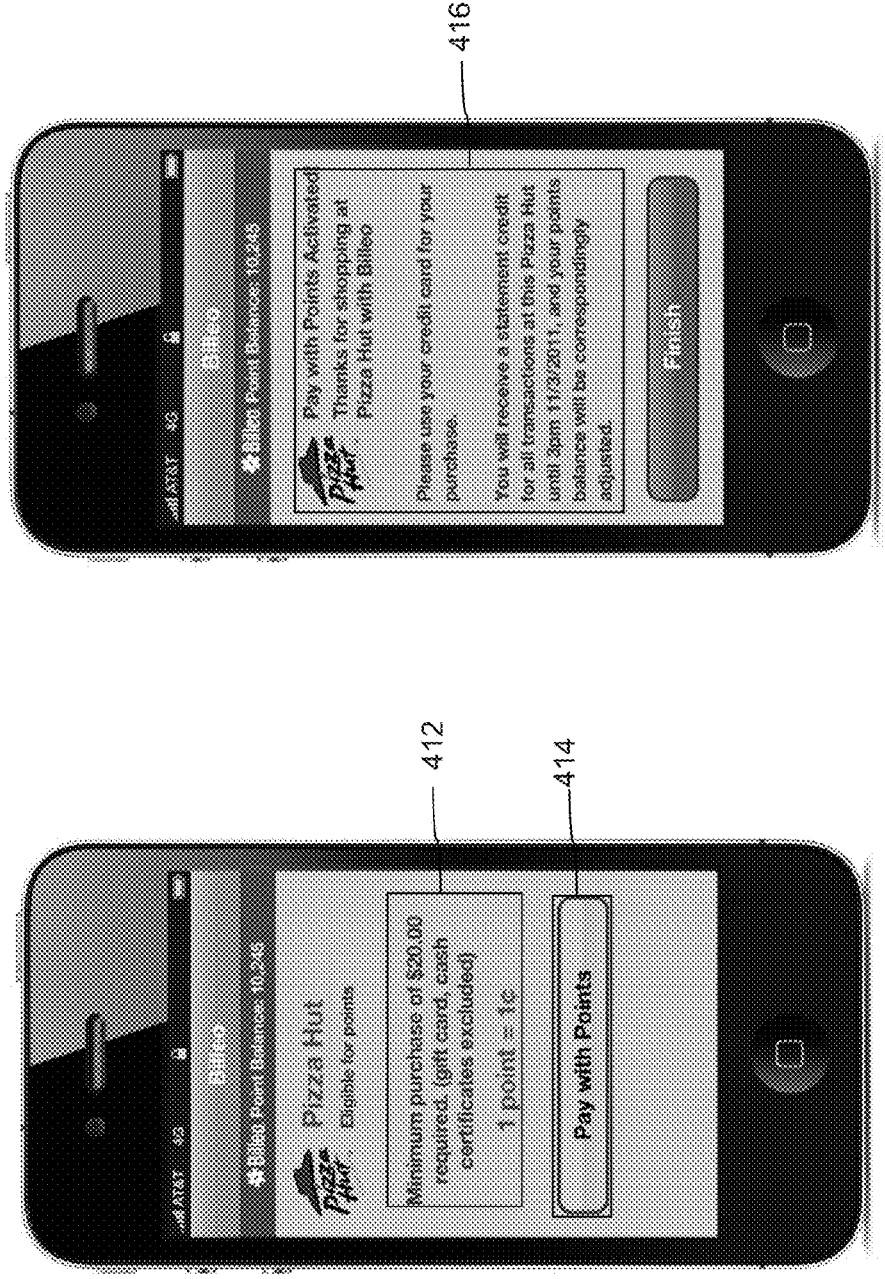

FIG. 4F

METHODS AND SYSTEMS FOR PAYING WITH LOYALTY CURRENCY DURING IN-STORE SHOPPING

CROSS-REFERENCE TO RELATED APPLICATION

This application is a continuation in part (CIP) of U.S. patent application Ser. No. 13/041,343, filed on Mar. 4, 2011, which is incorporated by reference herein.

TECHNICAL FIELD

The present disclosure is generally related to electronic transactions and more particularly, is related to paying with loyalty currency during in-store shopping.

BACKGROUND

Loyalty systems are conventionally used by various commercial organizations to increase customer retention as well as increase the customer base. Examples of commercial organizations may be one of a financial institution, a credit card company, an airline, a super mart, a grocery store, a convenience store, and the like. Loyalty systems reward a customer with loyalty points in return for usage of a product or a service marketed by a commercial organization. For example, several financial institutions that issue payment cards to customers reward them with loyalty points when the customer uses a payment card for shopping, dining, and so forth. The customer is able to redeem the points on the financial institution's website for goods and services from a variety of merchants assembled by the financial institution. Further, an example of a non-financial commercial organization issuing loyalty points may be an airline that rewards its customers with travel miles. The travel miles may be redeemed by the customers for that airline service when they have a minimum requisite number of travel miles in their account.

Typically, commercial organizations provide a limited range of options for redeeming the loyalty points. For example, a credit card company may tightly integrate with a merchant website and at merchant website checkout page a user having credit card associated with the credit card company can use his/her membership reward points associated with the credit card to make a purchase. Further, a retail store/in-store merchant like a super mart may issue customers with a loyalty card and provide the loyalty points on purchase of item(s). These loyalty points may be redeemed by the customers at the super mart by presenting the loyalty card at physical checkout counter of the super mart.

However, this facility of redeeming points at a retail store/in-store suffers from the major drawback that a particular loyalty card may be used for redeeming points at a particular retail store/in-store only. Further, customers may not know about total number of available loyalty points for redemption. Therefore, as per the current state of the art, the customers need to carry number of loyalty cards for redeeming their loyalty points for various retail stores/in stores. This gradually leads to deterioration in the customer's perceived value of the loyalty system, which further diminishes the loyalty to the brand. Further, loyalty cards are issued by in-store merchants and cannot be used for making any payments. The payments are made through payment cards issued by program sponsors. Thus, there exist no central utility that may assist customers in redeeming points associated with payment cards instead of loyalty cards issued by various store merchants.

SUMMARY

Example embodiments of the present disclosure provide systems for paying with loyalty currency during store shopping using an app. Briefly described, in architecture, one example embodiment of the system, among others, may be implemented as follows: a loyalty currency client, a tracking module, a presentation module, a currency rules module, and a loyalty currency acceptance report module.

Embodiments of the present disclosure may also be viewed as providing methods for paying with loyalty currency during physical store shopping using an app. In this regard, one embodiment of such a method, among others, may be broadly summarized by the following steps: presenting loyalty currency balance information corresponding to one or more program sponsors and one or more store merchants. The steps further include receiving a selection of a store merchant from the one or more store merchants. Thereafter, presenting one or more transaction rules associated with the selected store merchant. Further, activating paying with loyalty currency after accepting the one or more transaction rules and reporting the activation to a loyalty currency server connected with the app through a network.

Embodiments of the present disclosure may also be viewed as providing methods for updating payment card and loyalty point's statements. In this regard, one embodiment of such a method, among others, may be broadly summarized by the following steps: receiving a request for activation of pay with points at a selected store merchant from list of store merchants. The steps further include updating one or more payment card statements and one or more loyalty point's statements based on received request. Thereafter, publishing the one or more payment card statements and loyalty point's statements.

BRIEF DESCRIPTION OF THE DRAWINGS

FIGS. 4A, 4B, 4C, 4D, 4E and 4F are screenshots of a loyalty currency client running as a mobile app, in accordance with an example embodiment of the present disclosure.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

In light of the above described deficiencies, there is a need for systems and methods that may facilitate an easier and more broadly usable system for redeeming of loyalty points, thereby increasing the customer perceived value of the loyalty program and the loyalty of the customer to the commercial organization. The systems and methods should enable the customers to redeem their loyalty points at any physical store that the customers intend to use for shopping using one or more payment cards.

The term 'store' or 'in-store' or 'merchant store' or 'retail store' in the various example embodiments of the present disclosure refer to a physical shop that a customer physically visits for purchasing items. Further, the term 'application' or 'app' or 'mobile app' in the various example embodiments of the present disclosure refer to an application software executing on a computing device such as a mobile phone, a smart phone, a tablet PC, a personal digital assistant (PDA), and the like. The application software of the computing device has the ability to communicate with various servers connected through plurality of networks. In addition, payment card in the various example embodiments of the present disclosure may refer to a credit card, a debit card, prepaid card and the like. The payment card enables payment of a transaction and is processed by a payment network and the transaction information is available through the payment network directly or through a program sponsor via the payment network.

The present disclosure relates to enabling paying with loyalty currency using one or more payment cards, awarded by one or more program sponsors, at any store using an application. However, the current state of the art discloses that loyalty cards issued by various stores enable redemption of loyalty points at their stores. In light of this, the various example embodiments of the present disclosure, enable paying with loyalty currency using one or more payment card over any store using an app, without requiring integration between the one or more program sponsors and the store. Further, the functioning of the app is independent of any store, which implies that the app is not dependent on the design and/or implementation levels of the store merchant.

Figure 1:
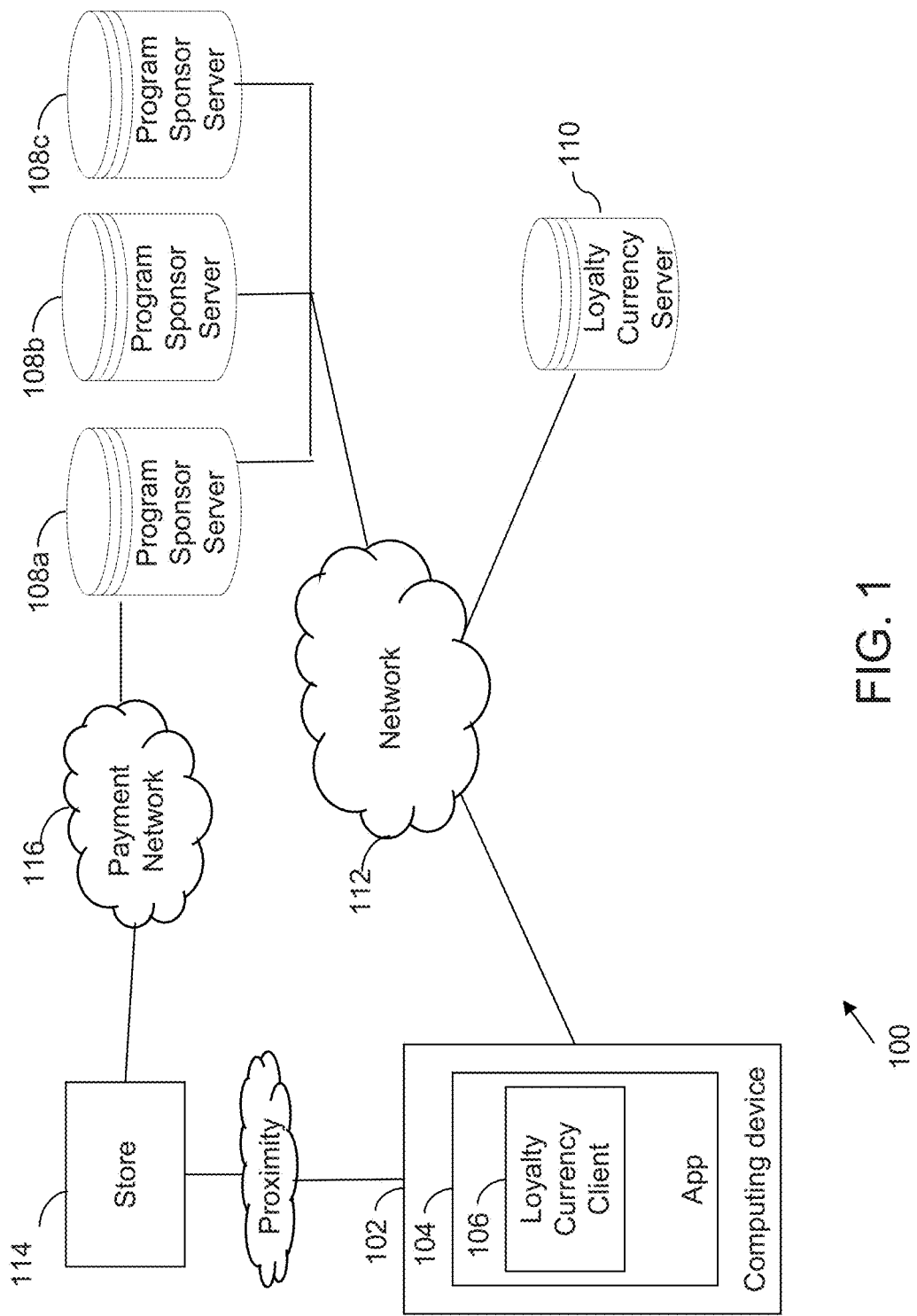
FIG. 1 is a block diagram of a system for paying with loyalty points during in-store shopping using an application, in accordance with an example embodiment of the present disclosure.

Referring now to FIG. 1, a system for paying with loyalty points during store shopping using a mobile app, in accordance with an example embodiment of the present disclosure is shown. System 100 includes computing device 102, app 104, loyalty currency client 106, program sponsor servers 108a, 108b, and 108c, loyalty currency server 110, network 112, store 114, and payment network 116.

Computing device 102 may be used by a user for store shopping when the user is located at store 114, user is present in proximity of store 114, user performs a search for one or more stores located in a particular location and the like. In an example embodiment of the present disclosure, computing device 102 is at least one of a mobile phone, a smart phone, a tablet PC, a personal digital assistant (PDA) and the like. Further, app 104 may be installed at computing device 102. App 104 may enable the user to pay with loyalty currency during store shopping at any store 114 by interacting with loyalty currency server 110 over network 112. In an example embodiment of the present disclosure, app 104 may reside in mobile operating systems. In example embodiment of the present disclosure, app 104 may be either a native app or a mobile web app. Further, in an example embodiment of the present disclosure, network 112 is the Internet. In an example embodiment of the present disclosure, the loyalty currency is provided by program sponsor servers 108a, 108b, and 108c In an example embodiment of the present disclosure, a program sponsor issues one or more payment cards to one or more customers for purchasing items. In an example embodiment of the present disclosure, a program sponsor is at least one of a banking institution, a credit card company, a financial institution the like. In an example embodiment of the present disclosure, the loyalty currency includes loyalty points, membership points, reward points, mileage points, miles and the like. In another example embodiment of the present invention, the loyalty currency is any fungible means such as e-vouchers, coupons, and the like.

Further, app 104 may host loyalty currency client 106. Loyalty currency client 106 may track shopping location of the user, proximity to one or more stores location and the like. In an example embodiment of the present disclosure, loyalty currency client 106 utilizes technologies such as Global Positioning System (GPS) and the like for tracking location of the user. Additionally, loyalty currency client 106 may interface with loyalty currency server 110 using network 112 for obtaining the loyalty currency balance information and one or more store merchants for a user. The operations performed by loyalty currency client 106 have been explained in detail in conjunction with FIG. 2.

Further, loyalty currency server 110 may provide the loyalty currency balance information corresponding to a user through loyalty currency client 106. Additionally, loyalty currency server 110 may provide one or more transaction rules to loyalty currency client 106 associated with one or more store 114. Further, loyalty currency server 110 may provide a predetermined threshold of loyalty currency balance required for the user to be able to redeem the loyalty points. In an example embodiment of the present invention, the loyalty currency server 110 may provide one or more transaction rules such as a list of store merchants where the loyalty points may be redeemed, a list of store merchants where the loyalty points may not be redeemed, currency conversion formulas, minimum currency usage limit, acceptable time window to complete a transaction, a list of the participating store merchants, list of preferred store merchants associated with a user, list of participating franchises associated with each of the participating store merchants, list of type of card members, such as gold card member, platinum card member, who may avail the loyalty points redeeming service, the time of the year during which this loyalty points redeeming service is available, the categories of goods purchased for which this service is valid, and the like. For example, any transaction or transactions that may happen during next 24 hours after use acceptance of the pay with loyalty currency will be valid and processed by loyalty currency server 110. Transactions that may fall outside the 24 hours timeframe will be treated as regular transactions. Additionally, the loyalty currency server 110 may provide a specific time frame, such as the time around major holidays, during which the service will be available and the like. Further, loyalty currency server 110 may be connected to loyalty currency client 106 and program sponsor servers 108a, 108b, and 108c through network 112. Loyalty currency server 110 may host one or more transaction rules for operating loyalty currency client 106. Loyalty currency server 110 may acquire information such as loyalty currency balance information, threshold of loyalty currency balance, one or more transaction rules, and the like from program sponsor servers 108a, 108b, and 108c. Loyalty currency server 110 has been explained in detail in conjunction with the FIG. 3.

Program sponsor servers 108a, 108b, and 108c may interact with store 114 merchant for enabling physical payment of a purchased item using a payment card affiliated with one of a program sponsors through payment network 116. In an example embodiment of the present disclosure, the interaction between program sponsor servers 108a, 108b, and 108c and store 114 may include payment processing and payment authorization through payment network 116 after user activates pay with points through app 104. In an example embodiment of the present disclosure, payment network 116 is the payment card network using for processing and authorization of payments made through payment cards. Program sponsor servers 108a, 108b, and 108c may maintain information about multiple users. The information may include but is not limited to loyalty currency balance information corresponding to a user, one or more transaction rules associated with one or more store 114, predetermined threshold of loyalty currency balance, and the like. Although three servers 108a, 108b, and 108c are provided in example embodiments, program sponsor server 108 may comprise a single server, two servers, or more than three servers, as well. Further, program sponsor servers 108a, 108b, and 108c may interact with loyalty currency server 110. In an embodiment of the present disclosure, program sponsor servers 108a, 108b, and 108c may receive a request from loyalty currency server of activation of pay with points at a selected store merchant from list of store merchants. Subsequently, program sponsor servers 108a, 108b, and 108c may update one or more payment card statements and one or more loyalty point's statements based on received request. Thereafter, program sponsor servers 108a, 108b, and 108c may publish the one or more payment card statements and loyalty point's statements.

Figure 2:
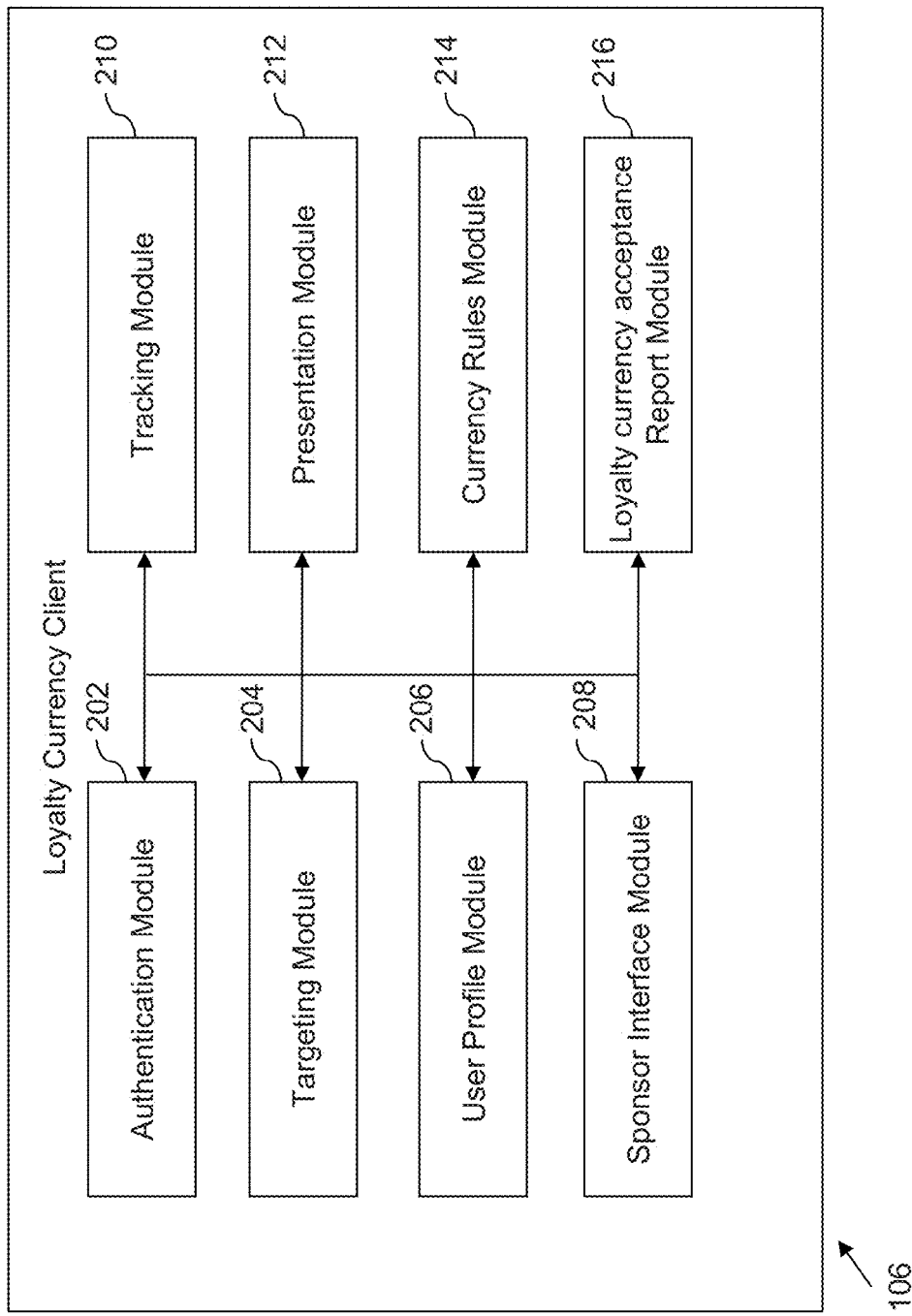
FIG. 2 is a block diagram of a loyalty currency client in detail, in accordance with an example embodiment of the present disclosure.

Referring now to FIG. 2, loyalty currency client 106 is shown in detail, in accordance with an example embodiment of the present disclosure. Loyalty currency client 106 includes authentication module 202, targeting module 204, user profile module 206, sponsor interface module 208, tracking module 210, presentation module 212, currency rules module 214, and loyalty currency acceptance report module 216.

Authentication module 202 authenticates at least one user with loyalty currency server 110 (refer FIG.1). In an example embodiment of the present disclosure, the user is automatically authenticated with loyalty currency server 110 based on preference settings stored in user profile module 206 of the user. Subsequent to authentication, tracking module 210 may be activated to identify location of the user. In an example embodiment of the present disclosure, tracking module 210 may track the location of the user while the user is travelling or shopping. In an example embodiment of the present disclosure, tracking module 210 may track one or more store 114 that the user visits. In an example embodiment of the present disclosure, tracking module 210 may track proximity to one or more stores location at which the user prefers to use loyalty currency. In an example embodiment of the present disclosure, tracking module 210 tracks one or more stores 114 that may be located proximity to the user. In an example embodiment of the present disclosure, tracking module 210 tracks the user performing a search of one or more stores 114 in a particular location of interest entered by the user. When the user either visits store 114 or located in proximity of store 114, tracking module 210 may inform targeting module 204. In an example embodiment of the present disclosure, tracking module 210 tracks user preferences selected by the user using presentation module 212. In an example embodiment of the present disclosure, tracking module 210 informs targeting module 204 that the user is visiting one of store 114 belonging to a preferred list of store merchants. In an example embodiment of the present disclosure, the preferred list of store merchants is provided to tracking module 210 by loyalty currency server 110 through sponsor interface module 208. For example, tracking module may track user preferences of preferred stores based on purchase history of the user. In an example embodiment of the present disclosure, tracking module 210 tracks a user selection of at least one loyalty currency balance information corresponding to one or more program sponsor servers 108a, 108b, and 108c presented to the user by presentation module 212 and accordingly notifies targeting module 204. Subsequently, tracking module 210 may also track a user selection of at least one store merchant associated with the selected loyalty currency balance information corresponding to one or more program sponsor servers 108a, 108b, and 108c presented to the user by presentation module 212 and accordingly notifies targeting module 204. In an example embodiment of the present disclosure, tracking module 210 tracks a user selection of store 114 merchant associated with a program sponsor server presented to the user by presentation module 212 and accordingly notifies targeting module 204. In an example embodiment of the present disclosure, tracking module 210 captures one or more transaction rules accepted by the user. In an example embodiment of the present disclosure, tracking module 210 tracks user acceptance of pay with points corresponding to a selected store 114 merchant and accordingly notifies targeting module 204.

User profile module 206 periodically extracts user profile information from loyalty currency server 110 (refer FIG. 1). In an example embodiment of the present disclosure, the user profile information includes but is not limited to an account holder name, a credit card number, a debit card number, a Card Verification Value (CVV) number, an expiration date, a prepaid card number, a merchant card number, list of preferred store merchants associated with a user, and the like. In an example embodiment of the present disclosure, user profile module 206 stores user preferences selected by a user. In an example embodiment of the present disclosure, user profile module 206 stores one or more preferred merchant stores that a user selects through presentation module 212. In an example embodiment of the present disclosure, user profile module 206 periodically stores one or more preferred merchant stores that tracking module 210 identifies based on purchases history.

Presentation module 212 presents the user with loyalty currency balance information corresponding to a program sponsor without a user input. In an example embodiment of the present disclosure, the loyalty currency balance information includes number of loyalty currency units credited to the user by the program sponsor. In an example embodiment of the present disclosure, the loyalty currency balance information corresponds to more than one program sponsor. In an example embodiment of the present disclosure, the loyalty currency balance information is based on aggregated loyalty currency units awarded by the same program sponsor corresponding to different products or services subscribed by the user. For example, the program sponsor is a financial institution that issues payment cards and the user owns two different payment cards issued by the same financial institution. In accordance with the loyalty currency balance calculation rules, the loyalty currency balance corresponding to the program sponsor is a sum of the loyalty points awarded to the user on the different payment cards issued by the same program sponsor. The loyalty currency balance information may be presented to the user in a predefined format. Further, in an example embodiment of the present disclosure, presentation module 212 presents the user with the loyalty currency balance information corresponding to a program sponsor, when the loyalty currency balance is above a predefined threshold. The predefined threshold may be provided by the loyalty currency server 110. In an example embodiment of the present disclosure, presentation module 212 presents the loyalty currency balance information based on a location that the user searches. In an example embodiment of the present disclosure, presentation module 212 may obtain the loyalty currency balance information and the predefined threshold from sponsor interface module 208 through targeting module 204.

In an example embodiment of the present disclosure, presentation module 212 presents one or more store merchants along with loyalty currency balance information associated with a program sponsor. In an example embodiment of the present disclosure, presentation module 212 may obtain the one or more store merchants from targeting module 204. Subsequently, presentation module 212 may present one or more transaction rules associated with store 114 merchant along with the corresponding loyalty currency balance information. In an example embodiment of the present disclosure, presentation module 212 presents one or more transaction rules based on selection of store merchant from one or more store merchants presented to the user. In an example embodiment of the present disclosure, presentation module 212 receives the one or more transaction rules from currency rules module 214 through targeting module 204 based on selection of store merchant.

Further, in an example embodiment of the present disclosure, presentation module 212 presents a confirmation to the user that choice for paying using the loyalty currency has been activated after the user accepts the transaction rules associated with store 114 merchant. In an example embodiment of the present disclosure, presentation module 212 presents a confirmation to the user that choice for paying using the loyalty currency for an upcoming purchase transaction at a selected store merchant has been activated after the user accepts the transaction rules associated with the selected store merchant. Additionally, presentation module 212 may inform the user that payment card transaction associated with the acceptance of paying with the loyalty currency will be matched and will be treated as a loyalty points purchase transaction. Subsequently, loyalty currency acceptance report module 216 may report user acceptance of pay with loyalty currency to loyalty currency server 110. In an example embodiment of the present disclosure, a user may purchase an item at store 114 using a payment card for which the user may have been confirmed that choice for paying with loyalty currency has been activated. Thereafter, loyalty currency acceptance report module 216 may report user acceptance of pay with loyalty currency to loyalty currency server 110 and loyalty currency server 110 accordingly updates a corresponding program sponsor. In an example embodiment of the present disclosure, the report includes but is not limited to a predefined Merchant Category Code (MCC) of the merchant store at which the user accepted the pay with loyalty currency, user identification, purchase timeframe acceptance, and the like. Subsequently, the program sponsor updates one or more payment card and one more loyalty points statements of the user.

Sponsor interface module 208 interfaces with loyalty currency server 110 for obtaining the loyalty currency balance information corresponding to a user. In an example embodiment of the present disclosure, sponsor interface module 208 periodically extracts loyalty currency balance information and predefined threshold corresponding to a user from loyalty currency server 110. In an example embodiment of the present disclosure, sponsor interface module 208 provides the loyalty currency balance information to targeting module 204. Additionally, sponsor interface module 208 may obtain one or more transaction rules from loyalty currency server 110 corresponding to one or more store merchants. In an example embodiment of the present disclosure, sponsor interface module 208 obtains one or more transaction rules associated with store 114 when the user visits store 114 for store shopping. In yet another example embodiment of the present disclosure, sponsor interface module 208 dynamically downloads one or more transaction rules from loyalty currency server 110. In an example embodiment of the present disclosure, sponsor interface module 208 provides one or more transaction rules to currency rules module 214. In an example embodiment of the present disclosure, sponsor interface module 208 provides one or more transaction rules to targeting module 204. In an example embodiment of the present disclosure, sponsor interface module 208 provides one or more transaction rules to tracking module 210 through targeting module 204. Further, sponsor interface module 208 may also obtain information corresponding to predetermined threshold of loyalty currency balance required for providing the user with an option for store shopping using loyalty currency. In an example embodiment of the present disclosure, sponsor interface module 208 obtains this information from loyalty currency server 110. In an example embodiment of the present disclosure, sponsor interface module 208 provides information corresponding to predetermined threshold to targeting module 204. In an example embodiment of the present invention, one or more transaction rules include but are not limited to a list of store merchants where the loyalty points may be redeemed, a list of store merchants where the loyalty points may not be redeemed, a list of preferred store merchants associated with a user, currency conversion formulas, minimum currency usage limit, acceptable time window to complete a transaction, a list of the participating store merchants, list of type of card members, such as gold card member, platinum card member, who may avail the loyalty points redeeming service, a specific time frame, such as the time around major holidays, during which the service will be available, and the like. For example, the currency conversion formulas may be equations that govern relationship between real currency and the loyalty currency with respect to one or more store merchants. Additionally, the minimum currency usage limit may be one or more conditions related to minimum amount of item that should be purchased for becoming eligible for pay with points at store merchant.

Targeting module 204 provides the loyalty currency balance information and the predefined threshold to the presentation module 212 corresponding to program sponsor servers 108a, 108b, and 108c. In an example embodiment of the present disclosure, targeting module 204 provides one or more store merchants to presentation module 212 based on the location of the user provided by tracking module 210. In an example embodiment of the present disclosure, targeting module 204 provides one or more store merchants to presentation module 212 based on the list of predefined store merchants provided by tracking module 210. In an example embodiment of the present disclosure, targeting module 204 generates one or more store merchants based on previous shopping activity of the user or location of the user. In an example embodiment of the present disclosure, targeting module 204 provides one or more transaction rules to presentation module 212 through currency rules module 214.

Currency rules module 214 receives one or more transaction rules from sponsor interface module 208. In an example embodiment of the present disclosure, the one or more transaction rules for various store merchants may include but are not limited to, currency conversion formulas, minimum currency usage limit, acceptable time window to complete a transaction, list of the participating store merchants, list of preferred store merchants associated with a user, list of participating franchises associated with each of the participating store merchants, and the like.

Loyalty currency acceptance report module 216 captures user acceptance information and reports that information to a loyalty currency server 110. In an example embodiment of the present disclosure, loyalty currency acceptance report module 216 captures activation request for paying with loyalty currency for an upcoming purchase transaction corresponding to a selected store 114 and reports appropriate information to loyalty currency server 110. In an example embodiment of the present disclosure, the information includes but is not limited to a predefined Merchant Category Code (MCC) of the merchant store at which the user accepted the pay with loyalty currency, user identification, purchase timeframe acceptance, and the like. Thereafter, loyalty currency server 110 may send the received report to one or more program sponsor servers 208a, 208b, and 208c. Subsequently, one or more program sponsor servers 208a, 208b, and 208c may debit loyalty points from the loyalty points balance information and may apply a credit to the real currency purchase of the user.

In the various example embodiments of the present disclosure, targeting module 204 acts as an interface between all the modules such as authentication module 202, user profile module 206, sponsor interface module 208, tracking module 210, presentation module 212, currency rules module 214, and loyalty currency acceptance report module 216. The interfacing performed by targeting module 204 entails determining a context from the information received from a first module and determining a suitable response to the context. Based on the determined response, targeting module 204 may direct a module to perform a suitable action. In an example, when presentation module 212 interacts with tracking module 210, the communication is performed through targeting module 204. Targeting module 204 determines the context from the information received from tracking module 210. For example, if tracking module 210 informs targeting module 204 that the user is visiting store 114 merchant, targeting module 204 acts upon this information and directs presentation module 212 to display loyalty points balance information along with one or more store merchants located in proximity to location of the user. In another example, when currency rules module 208 communicates with presentation module 212, the communication is performed through targeting module 204.

Figure 3:
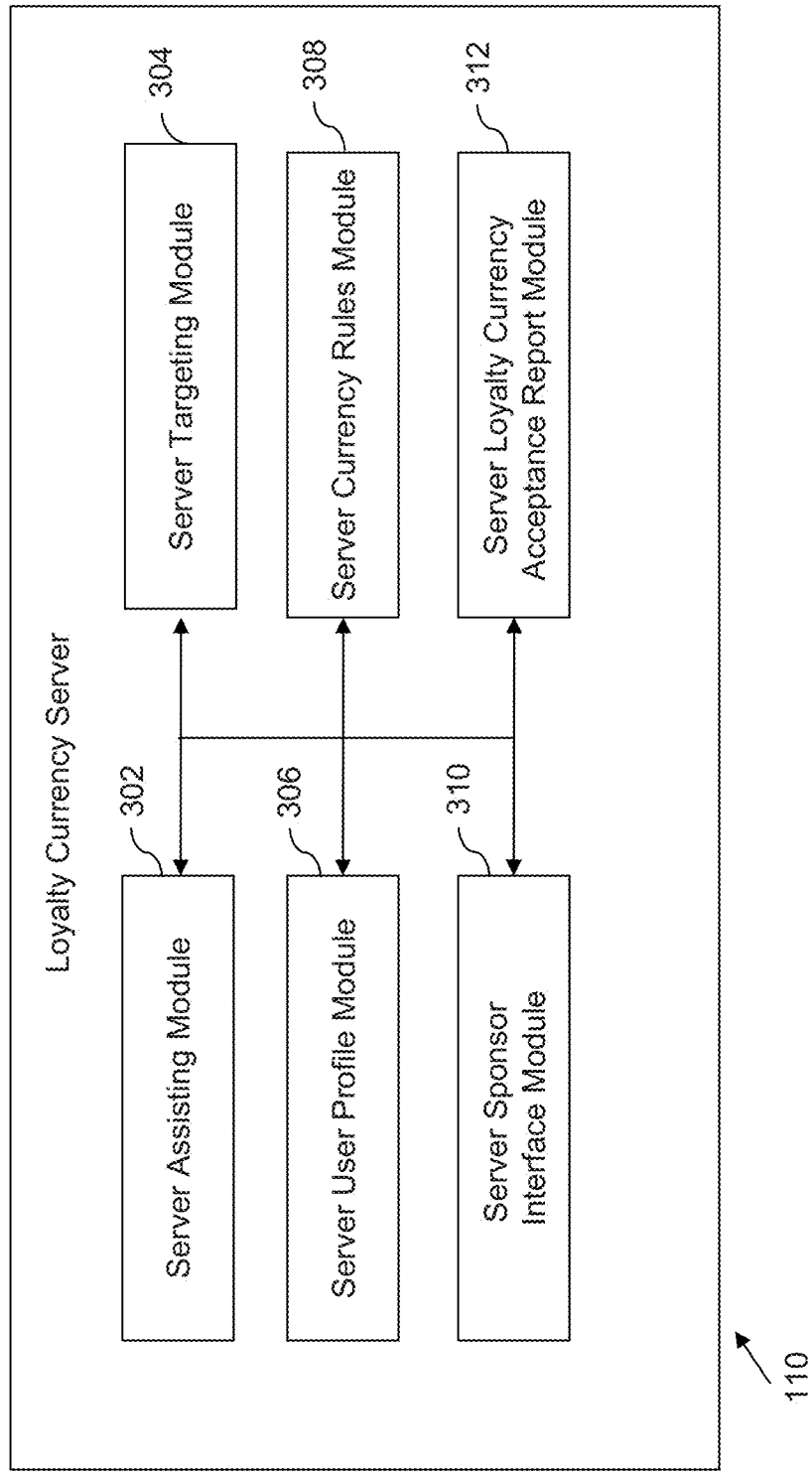
FIG. 3 is a block diagram of a loyalty currency server in detail, in accordance with an example embodiment of the present disclosure.

Referring now to FIG. 3, loyalty currency server 110 is shown in detail, in accordance with an embodiment of the present disclosure. Loyalty currency server 110 includes server assisting module 302, server targeting module 304, server user profile module 306, server currency rules module 308, server sponsor interface module 310, and server loyalty currency acceptance report module 312.

In an embodiment of the present disclosure, server assisting module 302, server targeting module 304, server user profile module 306, server currency rules module 308, server sponsor interface module 310, and server loyalty currency acceptance report module 312 may be located in loyalty currency server 110. In such a scenario, server targeting module 304, server user profile module 306, server currency rules module 308, server sponsor interface module 310, and server loyalty currency acceptance report module 312 perform similar functionalities as performed by their counterparts explained in conjunction with FIG. 2 above. Further, server assisting module 302 performs the authentication functionalities when requested by authentication module 202. Server sponsor interface module 310 may interface with program sponsors 108a, 108b, and 108c for accessing data corresponding to all users, or for a specific user. In an example embodiment of the present disclosure, the data may include loyalty currency balance information and predefined threshold of loyalty currency corresponding to all users, or for a specific user. Further, server sponsor interface module 310 may interface with program sponsors 108a, 108b, and 108c for obtaining one or more transaction rules corresponding to all users, or for a specific user. Additionally, server sponsor interface module 310 may interface with program sponsors 108a, 108b, and 108c for obtaining one or more transaction rules corresponding to one or more store, or for a specific store. In an example embodiment of the present disclosure, the one or more transaction rules may include but not limited to a list of store merchants where the loyalty points may be redeemed, a list of store merchants where the loyalty points may not be redeemed, currency conversion formulas, minimum currency usage limit, acceptable time window to complete a transaction, a list of the participating store merchants, a list of participating franchises associated with each of the participating store merchants, list of preferred store merchants associated with a user, list of type of card members, such as gold card member, platinum card member, who may avail the loyalty points redeeming service, a specific time frame, such as the time around major holidays, during which the service will be available. In an embodiment of the present invention, server sponsor interface module 310 maintains the 'single sign-on' mechanism to securely exchange information with program sponsors 108a, 108b, and 108c. Server user profile module 306 may periodically provide the user information upon a request by user profile module 206. Server user profile module 306 may also periodically provide list of preferred store merchants associated with a user to user profile module 206. Server currency rules module 308 may obtain the one or more transaction rules from server sponsor interface module 310. Further, server loyalty currency acceptance report module 312 may collect information, in aggregate format corresponding to all users, or for a specific user, from loyalty currency acceptance report module 216, and may send the information to program sponsors 108a, 108b, and 108c. Thereafter, program sponsors 108a, 108b, and 108c may match the information with respect to payment card transaction associated with a specific user and may accordingly update purchase card and point's statement associated with that user.

Figure 4B:
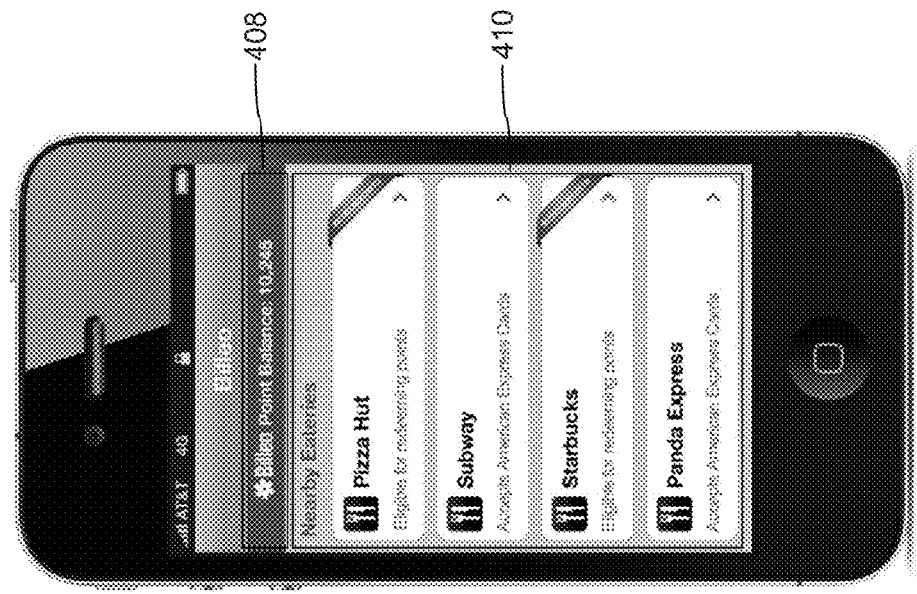
Figure 4A:
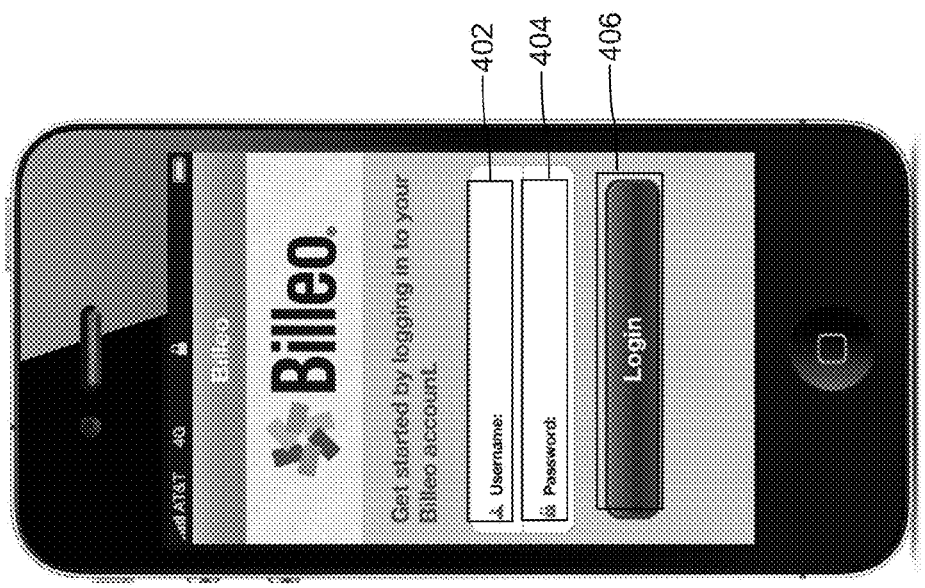
Figure 4E:
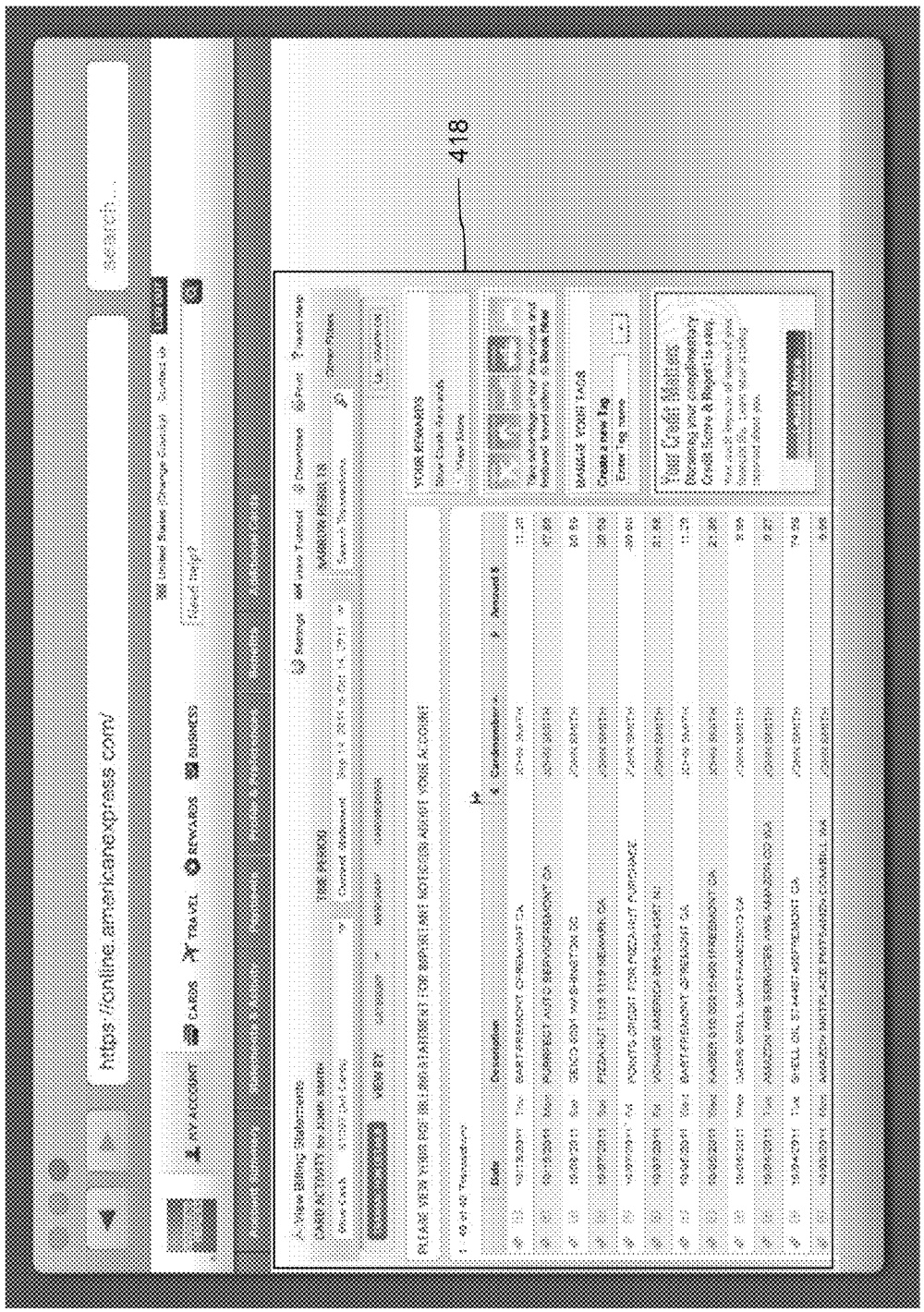

Referring now to FIGS. 4A, 4B, 4C, 4D, 4E and 4F screenshots of a mobile app running are shown, in accordance with an example embodiment of the present disclosure is shown. FIG. 4A includes username box 402, password box 404 and login box 406. FIG. 4B includes loyalty currency balance information box 408 and list of store merchants box 410. FIG. 4C includes transaction rules box 412, and pay with points box 414. FIG. 4D includes confirmation box 416. FIG. 4E includes payment card statement box 418. FIG. 4F includes loyalty points statement box 420.

Referring now to FIG. 4A, username box 402, password box 404 and login box 406 is shown. Authentication module 202 authenticates user credentials like username and password with loyalty currency server 110 through server assisting module 302 (refer FIG. 2 and FIG. 3) as explained in detail in conjunction with FIG. 2 above.

Referring now to FIG. 4B, loyalty currency balance information box 408 may include the loyalty currency balance information about the authenticated user. List of store merchants' box 410 may include a one or more store merchants located in the proximity of the authenticated user. Presentation module 212 may obtain the loyalty currency balance information from sponsor interface module 208 through targeting module 204 and presents the loyalty currency balance information. Presentation module 212 may obtain the one or more store merchants from the targeting module 204 based on the location of the authenticated user and present the one or more store merchants. Further, tracking module 210 may track the location of user and accordingly notifies targeting module 204.

Referring now to FIG. 4C, transaction rules box 412 may include one or more transaction rules associated with a selected store merchant from list of store merchants 410 presented by presentation module 212. Further, presentation module 212 may obtain the one or more transaction rules from currency rules module 214 through targeting module 204 as explained in detail in conjunction with FIG. 2. Additionally, pay with points box 414 may be selected by the user for accepting that upcoming purchase transaction with the selected store merchant be treated as pay with points.

Referring now to FIG. 4D, confirmation box 416 may include a confirmation for the user that the choice for paying using the loyalty currency for upcoming purchase transaction at the selected store merchant has been accepted and a program sponsor server will appropriately provide payment and points statement to the user. In an example embodiment of the present disclosure, confirmation box 416 is presented to the user by presentation module 212.

Referring now to FIG. 4E, payment card statement box 418 may include a list of payment card transactions being performed by the user. Here, the payment card transaction associated with the selected store merchant (refer FIG. 4B) may show a credit note of a purchased item and subsequently a debit note of the purchased item in statement box 418 may be updated as the user has selected pay with loyalty currency for upcoming purchase transaction at the selected store merchant.

Referring now to FIG. 4F, loyalty points statement box 420 may include a list of pay with points transactions being performed by the user. Here, the pay with points transaction associated with the selected store merchant (refer FIG. 4B) may show that number of points related to the store shopping of a purchased item are debited in statement box 420 for which pay with loyalty currency has been selected for the upcoming purchase transaction at the selected store merchant.

Figure 5:
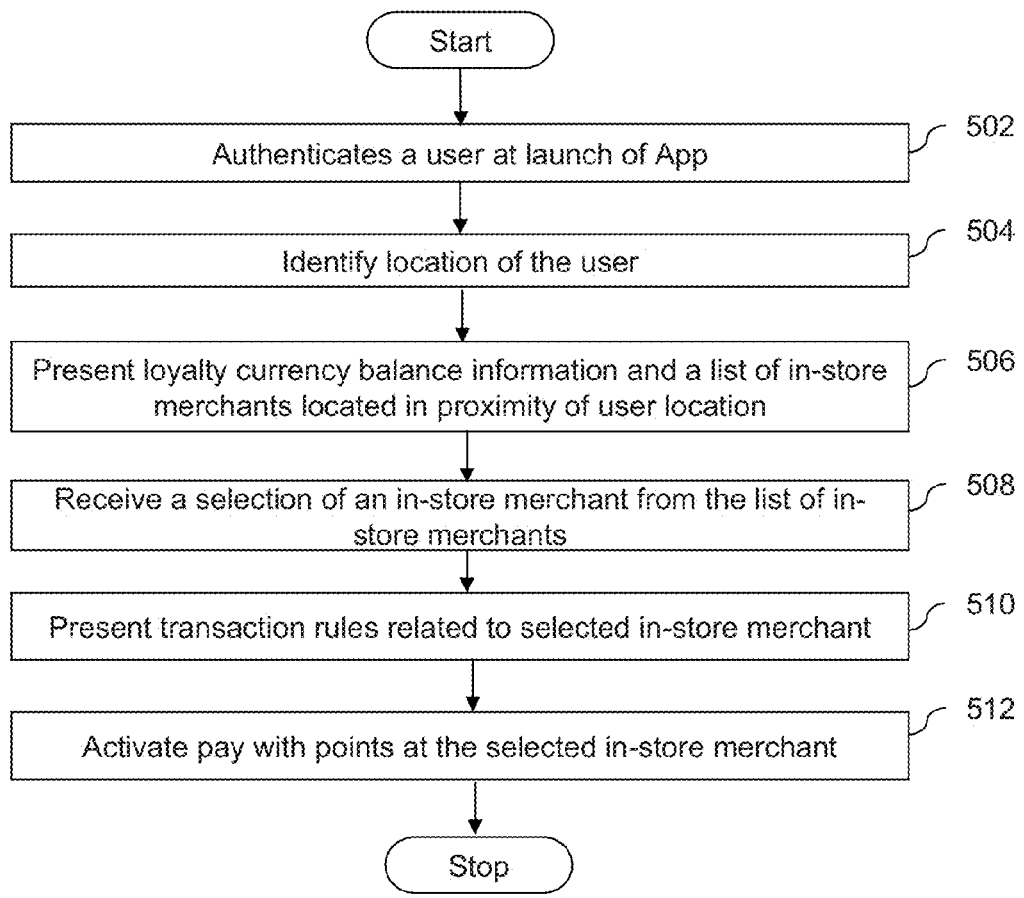
FIG. 5 is a flowchart of a method for paying with loyalty points during in-store shopping using an application, in accordance with an example of the present disclosure.

Referring now to FIG. 5, a flowchart is provided illustrating a method for paying with loyalty currency at one or more store 114 merchants by a user using app 104, in accordance with an example embodiment of the present disclosure. FIG. 5 will now be explained in detail in conjunction with FIGS. 2, 3, 4A, 4B, 4C, 4D, 4E, and 4F.

In block 502, a user is automatically authenticated at launch of a mobile app. In an example embodiment of the present disclosure, the user is automatically authenticated based on stored preference settings of the user. In an example embodiment of the present disclosure, the user is authenticated by using authentication module 202 with loyalty currency server 110. In an example embodiment of the present disclosure, the user manually inputs user name and password in username box 402 and a password box 404 and selects login box 406 for authentication of the user (refer FIG. 4A).

In block 504, once the user is authenticated, location of the user is tracked. In an example embodiment of the present disclosure, the location of the user is tracked using Global Positioning System GPS and the like. In an example embodiment of the present disclosure, tracking module 210 tracks the location of the user while the user is shopping or traveling. In an example embodiment of the present disclosure, tracking module 210 tracks one or more stores 114 that the user visits. In an example embodiment of the present disclosure, tracking module 210 tracks one or more stores 114 that may be located in proximity to the user. In an example embodiment of the present disclosure, tracking module 210 tracks the user performing a search of one or more stores 114 in a particular location of interest entered by the user. In an example embodiment of the present disclosure, tracking module 210 informs targeting module 204 location of the user. In an example embodiment of the present disclosure, tracking module 210 informs targeting module 204 that the user is visiting store 114. In an example embodiment of the present disclosure, tracking module 210 informs targeting module 204 one or more stores 114 that may be located in proximity of the user. In an example embodiment of the present disclosure, tracking module 210 tracks user preferences selected by the user using presentation module 212. In an example embodiment of the present disclosure, tracking module 210 informs targeting module 204 that the user is visiting one of store 114 belonging to a preferred list of store merchants. In an example embodiment of the present disclosure, the preferred list of store merchants is provided to tracking module 210 by loyalty currency server 110 through sponsor interface module 208. For example, tracking module may track user preferences of preferred stores based on purchase history of the user.

In block 506, the user is presented with loyalty currency balance information associated with a program sponsor and a one or more store merchants located in the proximity of the user. In an example embodiment of the present disclosure, a presentation module such as presentation module 212 presents the loyalty currency balance information associated with a program sponsor and one or more store merchants located in the proximity of the user. In an example embodiment of the present disclosure, presentation module 212 may obtain the one or more store merchants from targeting module 204 based on location information provided by tracking module 210. In an example embodiment of the present disclosure, presentation module 212 may obtain preferred list of one or more store merchants from targeting module 204 through user profile module 206 based on location information provided by tracking module 210. In an example embodiment of the present disclosure, loyalty currency includes at least one of a loyalty points, membership points, reward points, mileage points, miles, e-vouchers, coupons, and the like. In an example embodiment of the present disclosure, the loyalty currency balance information includes number of loyalty currency units credited to the user by the one or more program sponsors. In an example embodiment of the present disclosure, the program sponsors is at least one of a banking institution, a financial institution, a credit card company, an airline, a super market, a grocery store, and a convenience store. In an example embodiment of the present disclosure, the loyalty currency balance information is based on aggregated loyalty currency units awarded by the same program sponsor corresponding to different products or services subscribed by the user. For example, this is the case in a scenario when the program sponsor is a financial institution that issues payment card and the user owns two different payment cards issued by the same financial institution. In accordance with the loyalty currency balance calculation, the loyalty currency balance corresponding to the program sponsor is a sum of the loyalty points awarded to the user on the different payment cards issued to the user by the same financial institution. The loyalty currency balance information is presented to the user in a predefined format. In an example embodiment of the present disclosure, a presentation module, such as presentation module 212, presents the user with the loyalty currency balance information corresponding to a program sponsor, when the loyalty currency balance is above a predefined threshold. The predefined threshold is provided by the program sponsor. In an example embodiment of the present disclosure, the loyalty currency balance information is presented to the user when the user visits a store merchant. In an example embodiment of the present disclosure, the loyalty currency balance information is presented to the user when the user visits a store merchant that belongs to a predefined list of store merchants.

In block 508, selection of a store merchant from the one or more store merchants is received. In an example embodiment of the present disclosure, the user selects a store merchant from one or more store merchants. In an example embodiment of the present disclosure, tracking module 210 receives the selection of a store merchant from the one or more store merchants and accordingly notifies targeting module 204.

In block 510, the user is presented with one or more transaction rules associated with the selected store merchant. In an example embodiment of the present disclosure, a presentation module such as presentation module 212 presents one or more transaction rules associated with the selected store merchant (refer FIG. 4B, transaction box 412). In an example embodiment of the present disclosure, a presentation module obtains the one or more transaction rules associated with the selected store merchant from currency rules module 214 through targeting module 204. Further, targeting module 204 may obtain the one or more transaction rules from currency rules module 214 based on a notification about selected store merchant received from tracking module 210. In an example embodiment of the present invention, one or more transaction rules include but are not limited to a list of store merchants where the loyalty points may be redeemed, a list of store merchants where the loyalty points may not be redeemed, currency conversion formulas, minimum currency usage limit, acceptable time window to complete a transaction, list of the participating store merchants, list of participating franchises associated with each of the participating store merchants, list of preferred store merchants associated with a user, list of type of card members, such as gold card member, platinum card member, who may avail the loyalty points redeeming service, a specific time frame, such as the time around major holidays, during which the service will be available, and the like. Further, the currency conversion formulas may be equations that govern relationship between real currency and the loyalty currency with respect to one or more store merchants. Additionally, the minimum currency usage limit may be one or more conditions related to minimum amount of item that should be purchased for becoming eligible for pay with points at a store merchant.

In block 512, pay with loyalty points for upcoming purchase transaction at the selected store merchant is activated and a transaction report is sent to loyalty currency server 110. That is, once the user accepts the transaction rules associated with the selected store merchant (refer FIG. 4C, pay with points box 414), then pay with loyalty points for an upcoming purchase transaction at the selected store merchant may be activated and a transaction report may be sent to loyalty currency server 110. In an example embodiment of the present disclosure, the transaction report includes but is not limited to a predefined Merchant Category Code (MCC) of the merchant store at which the user accepted the pay with loyalty currency, user identification, purchase timeframe acceptance, and the like. Thereafter the method terminates.

Figure 6:
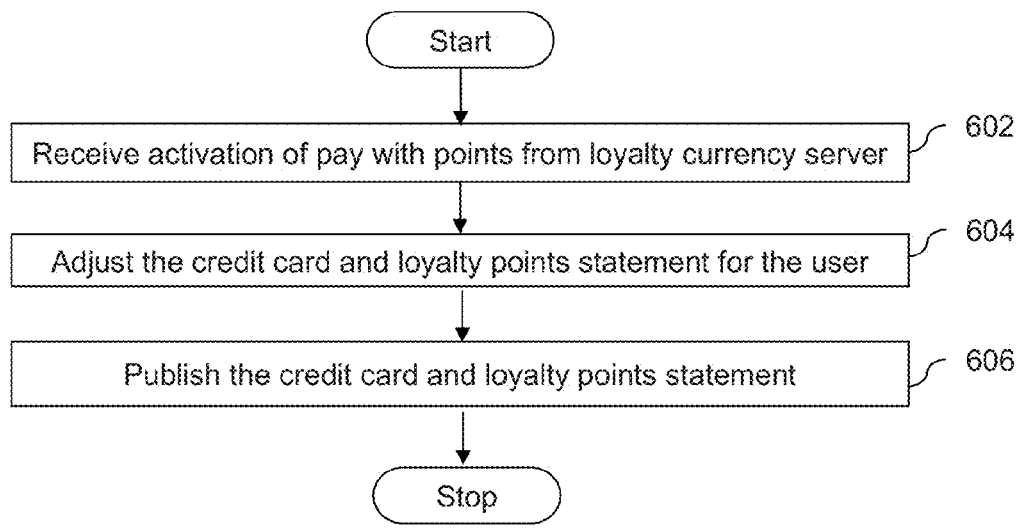
FIG. 6 is a flowchart of a method for updating payment card and loyalty point's statements at one or more program sponsor servers, in accordance with an example of the present disclosure.

Referring now to FIG. 6, a flowchart is provided illustrating a method for updating payment card and loyalty point's statement at program sponsor servers 208a, 208b, and 208c, in accordance with an example embodiment of the present disclosure. FIG. 5 will now be explained in detail in conjunction with FIGS. 2, 3, 4B, 4E, and 4F.

In block 602, request for activation of pay with points at a selected store merchant from list of store merchants box 410 (refer FIG. 4B) is received. In an example embodiment of the present disclosure, program sponsor servers 208a, 208b, and 208c receives request for activation of pay with points at a selected store merchant associated with a specific user. In an example embodiment of the present disclosure, program sponsor servers 208a, 208b, and 208c receives a consolidated request for activation of pay with points associated with multiple users or a specific user. In an example embodiment of the present disclosure, program sponsor servers 208a, 208b, and 208c receives request for activation of pay with points from loyalty currency server 110.

In block 604, one or more payment card statements and one or more loyalty point's statements are updated based on received request. In an example embodiment of the present disclosure, program sponsor servers 208a, 208b, and 208c matches payment card transactions of a user at a store merchant with the received request for activation of pay with points at a selected store merchant of the user. Subsequently, program sponsor servers 208a, 208b, and 208c may update one or more payment card statements and one or more loyalty point's statements of the user.

In block 606, one or more payment card statements and one or more loyalty point's statements are published. In an example embodiment of the present disclosure, program sponsor servers 208a, 208b, and 208c publishes one or more payment card statements (refer FIG. 4E, payment card statement box 418) and one or more loyalty point's statements (refer FIG. 4F, loyalty points statement box 420) of a user. In an example embodiment of the present disclosure, program sponsor servers 208a, 208b, and 208c publishes one or more payment card statement and one or more loyalty point's statement of a user on network 112.

The flow charts of FIG. 5 and FIG. 6 show the architecture, functionality, and operation of a possible implementation of loyalty currency payment software. In this regard, each block may represent a module, segment, or portion of code, which comprises one or more executable instructions for implementing the specified logical function(s). It should also be noted that in some alternative implementations, the functions noted in the blocks may occur out of the order noted in FIG. 5 and FIG. 6. For example, two blocks shown in succession in FIG. 5 and FIG. 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations may be made thereto without departing from the spirit and scope of the invention as defined by the appended claims.

The invention claimed is:

1. A method for paying with loyalty currency at one or more store merchants by a user using an app, the loyalty currency being provided by one or more program sponsors, the method comprising:
    presenting, by a computing device, loyalty currency balance information corresponding to one or more program sponsors and one or more store merchants when the user visits the one or more store merchants;
    receiving, by the computing device, a selection of a store merchant from the one or more store merchants for payment with the loyalty currency;
    presenting, by the computing device, one or more transaction rules associated with the selected store merchant, wherein the one or more transaction rules are dynamically downloaded from at least one program sponsor when the user selects the store merchant from the one or more store merchants;
    activating, by the computing device, payment with the loyalty currency after accepting the one or more transaction rules; and
    reporting, by the computing device, the activation to a loyalty currency server connected with the app through a network,
    wherein the app is independent of the one or more store merchants, the app enables payment with the loyalty currency using one or more payment cards at the one or more store merchants and wherein the method is implemented using the app being installed at the computing device.

2. The method of claim 1, further comprising presenting a set of the one or more store merchants to the user based upon a distance of the user with respect to the one or more store merchants.

3. The method of claim 1, further comprising presenting a set of the one or more store merchants to the user based upon a distance of the one or more store merchants from a location searched by the user.

4. The method of claim 1, wherein the one or more store merchants are preferred by the user.

5. The method of claim 1, wherein the loyalty currency comprises at least one of a loyalty points, membership points, reward points, mileage points, e-vouchers, coupons, and miles.

6. The method of claim 1, wherein the loyalty currency balance information comprises number of loyalty currency units credited to the user by the one or more program sponsors.

7. The method of claim 1, further comprising presenting one or more payment card statements and one or more loyalty points statements to the user.

8. The method of claim 1, wherein the one or more transaction rules comprises currency conversion formulas, minimum currency usage limit, and acceptable time window to complete a transaction.

9. The method of claim 1, wherein the one or more program sponsors is at least one of a banking institution, a financial institution, and a credit card company.

10. A system comprising:
    a processor; and
    a memory coupled to the processor, wherein the processor is configured to execute a loyalty currency client hosted by an app installed at a computing device in the memory, the app being independent of one or more store merchants, the loyalty currency client comprising:
        a tracking module configured for:
            I. tracking location of a user;
            II. tracking the user response to at least the one or more store merchants presented to the user as a set of one or more store merchants based on a location of the user;
            III. capturing user acceptance of pay-with-points on a selected store merchant from the one or more store merchants;
            IV. capturing one or more transaction rules accepted by the user;
        a presentation module configured for:
            I. presenting to the user at least one loyalty currency balance information corresponding to the one or more program sponsors and the one or more store merchants based on the location of the user when the user visits the one or more store merchants; and
            II. presenting to the user one or more transaction rules associated with a selected store merchant from the one or more store merchants;
        a currency rules module configured for providing the one or more transaction rules to the presentation module; and
        a loyalty currency acceptance report module configured for capturing a user acceptance information of the one or more transaction rules and reporting the information to a loyalty currency server connected with the app through a network.

11. The system of claim 10, further comprising a sponsor interface module for interfacing with the loyalty currency server for obtaining at least one loyalty currency balance information corresponding to the user, the one or more transaction rules corresponding to one or more store merchants for providing currency conversion formulas between points and real currency, minimum currency usage limit, and acceptable time window to complete a transaction.

12. The system of claim 10, further comprising the loyalty currency server for hosting one or more transaction rules for operating the loyalty currency client, wherein the loyalty currency server interacts with the loyalty currency client and the at least one program sponsor server over the network.

13. The system of claim 10, further comprising an authentication module for authenticating the user with the loyalty currency server.

14. The system of claim 10, further comprising a targeting module for interfacing between at least two of the presentation module, the tracking module, the currency rules module, and the loyalty currency acceptance report module, and selecting the one or more store merchants presented to the user based on the location of the user, wherein the targeting module selects the one or more transaction rules based on the selected store merchant.

15. The system of claim 10, wherein the user acceptance information comprises Merchant Category Code (MCC) of the selected store merchant at which the user accepted the pay with the loyalty currency, user identification, purchase timeframe acceptance.

16. The system of claim 10, wherein the presentation module is further configured for presenting a set of the one or more store merchants to the user based upon a distance of the one or more store merchants from a location searched by the user.

17. The system of claim 10, wherein the one or more store merchants are preferred by the user.

18. A non-transitory computer readable medium comprising a computer program, the computer program comprising instructions for:

presenting loyalty currency balance information corresponding to one or more program sponsors and one or more store merchants when the user visits the one or more store merchants;

receiving a selection of a store merchant from the one or more store merchants for payment with the loyalty currency, wherein the one or more store merchants are preferred by the user;

presenting one or more transaction rules associated with the selected store merchant, wherein the one or more transaction rules comprises currency conversion formulas, minimum currency usage limit, and acceptable time window to complete a transaction;

activating payment with the loyalty currency after accepting the one or more transaction rules, wherein payment with the loyalty currency is performed using one or more payment cards;

reporting the activation to a loyalty currency server connected with an app through a network; and presenting a payment card statement and a loyalty points statement to the user.

\* \* \* \* \*